United States Patent
Mills

(10) Patent No.: US 10,853,059 B2
(45) Date of Patent: *Dec. 1, 2020

(54) MANAGING HIGHLY SCALABLE CONTINUOUS DELIVERY PIPELINES

(71) Applicant: Oracle International Corporation, Redwood Shores, CA (US)

(72) Inventor: Duncan Richard Mills, Winchester (GB)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/552,777

(22) Filed: Aug. 27, 2019

(65) Prior Publication Data
US 2019/0384595 A1    Dec. 19, 2019

Related U.S. Application Data

(63) Continuation of application No. 15/255,048, filed on Sep. 1, 2016, now Pat. No. 10,437,585.

(60) Provisional application No. 62/245,707, filed on Oct. 23, 2015.

(51) Int. Cl.
*G06F 8/71* (2018.01)
*G06Q 10/06* (2012.01)

(52) U.S. Cl.
CPC ............ *G06F 8/71* (2013.01); *G06Q 10/06* (2013.01)

(58) Field of Classification Search
CPC .................................. G06F 8/71; G06Q 10/06
See application file for complete search history.

(56) References Cited

U.S. PATENT DOCUMENTS

| | | | |
|---|---|---|---|
| 8,347,292 B2* | 1/2013 | Beckerle | G06F 9/5038 718/101 |
| 8,677,315 B1* | 3/2014 | Anderson | G06F 8/60 717/101 |
| 9,021,458 B1 | 4/2015 | Jacob et al. | |
| 9,207,931 B2 | 12/2015 | Fox et al. | |
| 9,696,971 B1 | 7/2017 | Wierda et al. | |
| 2002/0087888 A1 | 7/2002 | Yamakawa et al. | |
| 2008/0209423 A1* | 8/2008 | Hirai | G06F 11/1482 718/102 |
| 2010/0299650 A1* | 11/2010 | Abrahamsen | G06Q 10/10 717/102 |
| 2012/0060165 A1* | 3/2012 | Clarke | G06F 11/3051 718/104 |

(Continued)

OTHER PUBLICATIONS

Loklindt et al., "How Blockchain could be adopted for exchanging documentation in the shipping industry" (Year: 2017).*

(Continued)

*Primary Examiner* — Phillip H Nguyen
(74) *Attorney, Agent, or Firm* — Kilpatrick Townsend & Stockton LLP

(57) ABSTRACT

Systems and methods are provided for managing and tracking process pipelines and other flows in a way that reduces the requirement for a central controlling process to manage every step of the associated pipeline flow and the state associated with each running instance. Job information and pipeline state are tracked by each worker involved in the pipeline. This enables some key capabilities within these process pipelines such as dynamic process re-writing and cross security domain job execution.

17 Claims, 8 Drawing Sheets

(56) References Cited

U.S. PATENT DOCUMENTS

| | | |
|---|---|---|
| 2013/0091350 A1 | 4/2013 | Gluck |
| 2013/0174124 A1 | 7/2013 | Watters et al. |
| 2013/0219361 A1* | 8/2013 | Fiebig .................. G06F 9/44 |
| | | 717/121 |
| 2014/0089896 A1 | 3/2014 | Mansour et al. |
| 2014/0278623 A1 | 9/2014 | Martinez et al. |
| 2015/0106790 A1 | 4/2015 | Bigwood et al. |
| 2015/0220426 A1* | 8/2015 | Spektor .................. G06F 8/71 |
| | | 717/131 |
| 2016/0364210 A1* | 12/2016 | Davidov .............. G06Q 10/06 |
| 2017/0010889 A1 | 1/2017 | Spektor et al. |
| 2017/0054798 A1* | 2/2017 | Katsuno ................ H04L 67/34 |
| 2017/0115976 A1 | 4/2017 | Mills |

OTHER PUBLICATIONS

Zhu et al., "PPMLT: A pipeline based processing model of long transactions" (Year: 2011).*

U.S. Appl. No. 15/255,048, "Non-Final Office Action", dated Mar. 7, 2018, 21 pages.

U.S. Appl. No. 15/255,048, "Final Office Action", dated Jul. 12, 2018, 23 pages.

U.S. Appl. No. 15/255,048, "Non-Final Office Action", dated Feb. 6, 2019, 23 pages.

U.S. Appl. No. 15/255,048, "Notice of Allowance", dated Jun. 3, 2019, 10 pages.

Humble et al., "Continuous Delivery", Addison-Wesley, 2011, 497 pages.

\* cited by examiner

MANAGING HIGHLY SCALABLE CONTINUOUS DELIVERY PIPELINES

CROSS REFERENCE TO RELATED APPLICATIONS

The present application is a continuation of, and claims the benefit and priority of U.S. application Ser. No. 15/255,048, filed Sep. 1, 2016, entitled "MANAGING HIGHLY SCALABLE CONTINUOUS DELIVERY PIPELINES", which claims the benefit and priority under 35 U.S.C. 119(e) of U.S. Provisional Application No. 62/245,707, filed Oct. 23, 2015, entitled "SYSTEM AND METHOD FOR MANAGING HIGHLY SCALABLE CONTINUOUS DELIVERY PIPELINES," the entire contents of which are incorporated herein by reference for all purposes.

FIELD OF THE DISCLOSURE

Embodiments are directed generally to an application development system, and in particular, to managing highly scalable continuous delivery pipelines for applications developed, for example, using a cloud-based service or hybrid cloud/enterprise system.

BACKGROUND OF THE DISCLOSURE

An application refers to a software program, which upon execution performs specific desired tasks. In general, several applications are executed in a run-time environment containing one or more of operating systems, virtual machines (e.g., supporting Java™ programming language), device drivers, etc., as is well known in the relevant arts.

The continuous delivery (CD) of software using products such as Hudson/Jenkins or TeamCity relies on the basic process of stringing together a series of individual jobs or tasks into some sort of pipeline where they are orchestrated to take the software product from source code, through compilation and testing into deployment, promotion, approvals and delivery. In common with many other similar process orchestrations (think SOA) the continuous delivery server has to manage each instance of the process pipelines that are running, receiving the results from one task before making a decision about what to do next. Conventional solutions to this used by products such as Hudson revolve around having a assigned process that is managing the pipeline instance for its lifetime.

Accordingly, what is desired is to solve problems relating to managing highly scalable continuous delivery pipelines for applications developed, for example, using a cloud-based service or hybrid cloud/enterprise system, some of which may be discussed herein. Additionally, what is desired is to reduce drawbacks relating to managing pipelines, some of which may be discussed herein.

BRIEF SUMMARY OF THE DISCLOSURE

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some examples, a computer-implemented method, a system, and/or a computer-readable medium may include sending a job package to a first build worker in response to launching a build pipeline, where an entire plan for the build pipeline can be written into the job package. The method, system, and/or computer-readable medium may also include receiving first results of a first job in the build pipeline performed by the first build worker, where a first transactional record associated with the first results may be maintained within a first build record held by the first build worker. Additionally, in some aspects, the method, system, and/or computer-readable medium may also include receiving second results of a second job in the build pipeline performed by a second build worker, where a second transactional record associated with the second results may be maintained within a second build record held by the second build worker. Further, in some examples, the method, system, and/or computer-readable medium may also include updating the first build record held by the first build worker with the second results of the second job in the build pipeline performed by the second build worker.

In at least some examples, sending the job package to the first build worker may comprise sending job information and a pipeline blockchain. Additionally, the method, system, and/or computer-readable medium may also include storing the second results of the second job in a central transaction record and/or determining whether to reconcile the second results of the second job with the first build record held by the first build worker. In some aspects, updating the first build record held by the first build worker with the second results of the second job in the build pipeline performed by a second build worker may comprise updating a build state associated with a portion of the entire plan for the build pipeline held at the first build worker. In some cases, the method, system, and/or computer-readable medium may also include receiving a change to the build pipeline and/or propagating the change to the first build worker and the second build worker. In some cases, sending the job package to the first build worker may comprise sending version information associated with the build pipeline and/or sending the job package to a build server behind a corporate firewall used for signing application code. Further, the method, system, and/or computer-readable medium may also include receiving build artifacts associated with the first job.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

DETAILED DESCRIPTION OF THE DISCLOSURE

Figure 1:
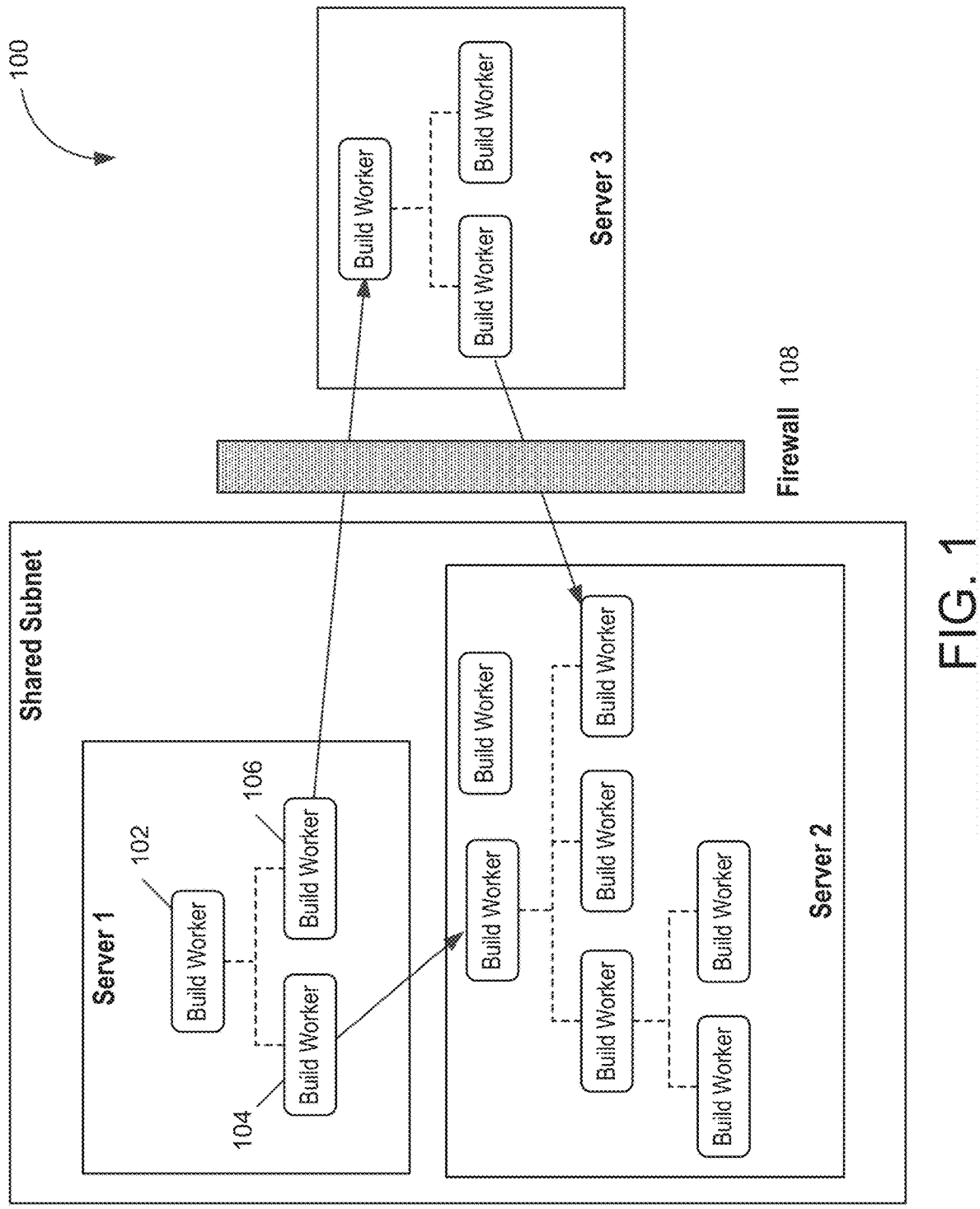
FIG. 1 is a block diagram of a continuous delivery build cluster topology in one embodiment according to the present disclosure.

In the following description, for the purposes of explanation, specific details are set forth in order to provide a thorough understanding of embodiments of the disclosure. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

In the following description, for the purposes of explanation, specific details are set forth in order to provide a thorough understanding of embodiments of the disclosure. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Embodiments relate to techniques for managing continuous delivery or continuous integration pipelines in a highly scalable, distributed, and fault tolerant manner. In such a system we may be presented with a complex topology where jobs may have to be allocated to workers distributed across multiple physical servers (real and virtual), networking subnets and even across top level domains, traversing multiple firewalls and network zones.

Within this type of distributed system, some problems relate to how to optimize the execution of the pipeline to cope with the constraints such as variable resource availability across the cluster nodes over time, access control constraints such as parts of the cluster being within a secured zone where unfettered communication to centralized servers may not be possible, simultaneous management of multiple pipelines and multiple instances (or even instances of versions) of the same pipeline concurrently across the logical cluster, efficient just-in-time reporting of pipeline progress from any point, and the like.

Continuous Delivery ("CD") as used herein refers to a process within software engineering where software is automatically compiled tested and deployed as part of an orchestrated process on a very frequent basis. A job as used herein refers to, within a continuous delivery system, individual processes such as compiling from source, running tests, or deploying an application. A pipeline as used herein refers to a continuous delivery process be constructed from a series of jobs that each carry out the atomic tasks that are required to take the software from source code to running application or shippable artefact. These jobs are orchestrated through a pipeline, which will control the ordering of job execution, manage branching and associated functions such as error recovery. A build as used herein refers to an instance of a job execution (e.g., the results thereof). A fork as used herein refers to an event within a pipeline where a single path is split into two or more parallel paths to allow for concurrent asynchronous execution of the following steps in the pipeline. A join as used herein refers to an event within a pipeline where two or more parallel execution streams recombine to a single stream. Generally a join will wait until all of the inbound jobs are complete before progressing to the next step in the pipeline.

Accordingly, embodiments provide advantages over a centralized server approach where portions of the pipeline can execute whilst out of contact from the originating server. A core example of this being useful is when a portion of a CD pipeline needs to execute behind a firewall where the servers running the jobs that make up that pipeline fragment may not be able to communicate their status directly to the originating CD server. Job Pipelines can also become dynamic rather than having to be based on static pre-written definitions. This allows a CD server to re-write the pipeline to enable parallelism or optimized resource usage without the build engineer having to have defined this ahead of time.

In some embodiments, management of pipeline instances becomes much more scalable as there is no longer a need to maintain a constant model of all running pipeline instances through a central server. This also imbues fault tolerance into the process.

FIG. 1 is a block diagram of a continuous delivery build cluster topology 100 in one embodiment according to the present disclosure. As illustrated, topology 100 includes server 1 and server 2 on a shared subnet, server 3, and a firewall between the shared subnet and server 3. Each of server 1, server 2, and server 3 represent individual physical and/or virtual machines. Each server includes one or more build workers disposed to accept a job (e.g., each build worker is part of a pool for a respective machine and can each take a step in the pipeline processing). In an example server 1, one build worker 102 may be processing one job, while one or more other build workers 104, 106 may be doing other jobs in parallel. Each build worker may be considered a node. One or more build workers may be arranged in a hierarchical manner, according to predetermined relationships, or the like. In some examples, server 1 and server 2 may exist within the same subnet (from an accessibility point of view), while server 3 may not be accessible to server 1 or server 2, because server 3 is behind firewall 108. Additionally, build worker 106 may send its completed job and status to one of the build workers of server 3, while build worker 104 may send its completed job and status to one of the build workers of server 2. The recipient build workers can then proceed to process the next job or pass the job and status along to other build workers in the pipeline.

Figure 2:
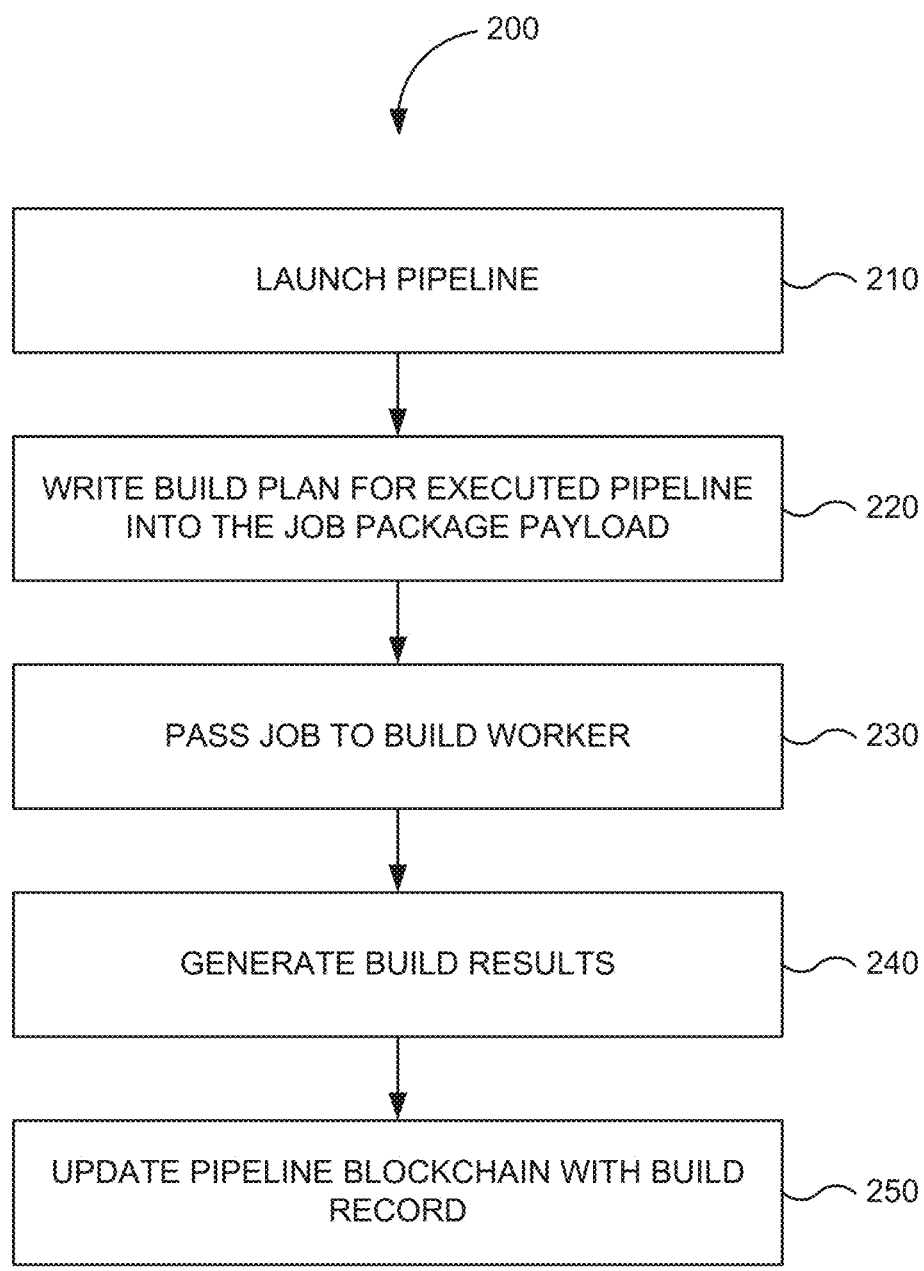
FIG. 2 is a flow diagram of a method for constructing a continuous delivery pipeline in accordance with embodiments of the present disclosure.

FIG. 2 is a flow diagram of method 200 for constructing a continuous delivery pipeline in accordance with embodiments of the present disclosure. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In step 210, a pipeline is launched. For example, topology 100 can select one or more build workers to initiate the pipeline. In step 220, a build plan for executed pipeline is written into a job package payload. In one embodiment, when the pipeline is launched, the entire plan for the being executed pipeline at that point in time is written into the job package payload. In step 230, the job is passed to a build worker. Accordingly, the description of the scheduled pipeline can be passed on with the job specification to the allocated worker.

In step 240, build results are generated. In step 250, a pipeline blockchain is updated with the build record. For example, once a job has completed, the results of that job are treated as a transactional record (similar to a blockchain transaction) and are updated into the pipeline blockchain within the build record that is held in the worker. Assuming a successful end state, the worker process now has enough information within the pipeline record to understand what to do next which may involve simply processing the next step, or passing control back to a different worker.

In some embodiments, as the worker is retired having completed the job, the build worker can record it's build state to a central build system record (either synchronously or in a proxied fashion as demanded by the topology). The pipeline blockchain (configuration and transaction state) can be a part of this recording. The next job in the pipeline that executes will likewise record its state into the pipeline blockchain upon completion.

In some embodiments, once this information is recorded, topology 100 can begin the task of propagating the pipeline blockchain changes to all previously completed jobs in the pipeline. This can be done in an asynchronous manner, and eventually all build records relating to the pipeline so far will have a consensus of the state of the pipeline.

Figure 3:
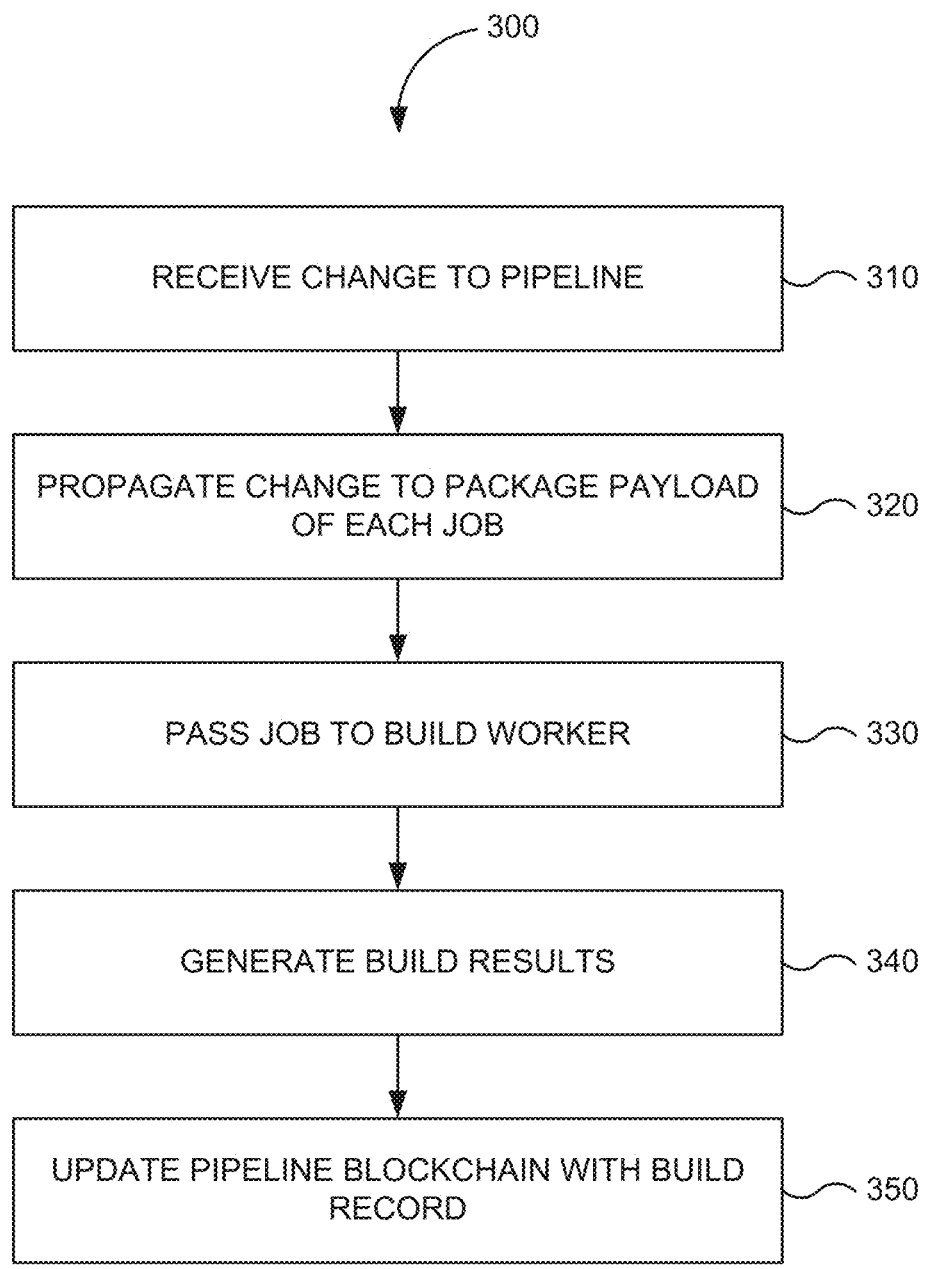
FIG. 3 is a flow diagram of a method for dynamically updating a continuous delivery pipeline in accordance with embodiments of the present disclosure.

In further embodiments, topology 100 can dynamically alter the pipeline. FIG. 12 is a flow diagram of method 300 for dynamically updating a continuous delivery pipeline in accordance with embodiments of the present disclosure. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In step 310, one or more changes are received to the pipeline. For example, topology 100 can decide, for operational reasons, to change the pipeline in a dynamic way (not predefined by the release engineer). Thus, such changes can be propagated back to all copies of the pipeline blockchain held against the pipeline instance as in step 320.

In step 330, the job is passed to a build worker. Accordingly, the description of the scheduled pipeline can be passed on with the job specification to the allocated worker. This ensures that any build record produced by the pipeline can be used to visualize and reconstruct the state of the pipeline as it now stands. In step 340, build results are generated. In step 350, a pipeline blockchain is updated with the build record.

By encoding a copy of the pipeline into each build job, topology 100 provides improved scalability by removing the need for a separate centralized pipeline management process, which would conventionally have to be notified and consulted at every step of the pipeline progression. This comes with the added benefit of not needing a centralized data store to record the state of each pipeline instance in flight, thus removing a possible point of failure and a resource cost.

Additionally, topology enables a single pipeline to be executed across multiple build clusters where different clusters are potentially remote from each other and possibly separated by firewalls and other access constraints. For example; proxying a portion of a pipeline from a public cloud based Continuous Delivery server to run in a secured remote on-premise build cluster behind a customer firewall. Servers running the build jobs behind the customer firewall would not necessarily need any direct access back to the cloud hosting environment and yet the public server will eventually be updated with the state of those opaque operations.

For the purposes of pipeline reporting and management, enough information is available in the payload of any of the completed jobs in the pipeline to inform of the entire state of the pipeline up until that point in time without having to conduct either a remote lookup to some management server, or a federated search of all of the involved jobs to ascertain status. Moreover, pipeline and job versioning is easily enabled. When a pipeline is launched, the required version of the pipeline flow is encoded into the pipeline blockchain, removing any risk of newer versions of the pipeline or associated jobs being accidentally executed. This is particularly important for complex, long running pipelines, which may execute over hours or days and need to retain a consistent world-view for that time.

In some embodiments, topology 100 provides for unlimited attempts to re-start a pipeline from the last known point without having to consult any central server for instructions. A partially completed pipeline instance can be cloned and executed in a simple manner. This can be important for the processes of testing the Continuous Delivery flows themselves, where reproducible initial conditions are needed.

Finally, ad-hoc pipelines can be created dynamically. Rather than always having to run a pipeline based on a fixed specification designed ahead of time, topology 100 now has the capability to dynamically create and update pipelines for internal purposes. For example; a single job executed on its own, not as part of a pipeline, may end up being internally rewritten by the server into an ad-hoc three job pipeline in order to proxy the job across to a remote cluster. Likewise, the server may choose to split a single logical job defined by the release engineer into physical sub tasks for operational reasons, for example to effectively exploit a restricted sub-pool of resources.

The dynamic re-definition of pre-defined pipelines can maximize throughput and resource usage. For example; the server may internally optimize a serial execution of jobs defined by a release engineer into a parallel execution of those same jobs to boost throughput in the case where sufficient resources are available. That same pipeline may be run in a purely serial manner under different loading conditions at a different time. Because the pipeline blockchain will be re-written to reflect the actual execution plan being used, there are no issues with the optimized execution path being out of step with the predefined understanding of the pipeline. Plus of course the block-chain provides an effective self-audit of the actual execution plan used to help with problem diagnosis should the optimization prove less optional or even non-functional.

Figure 4:
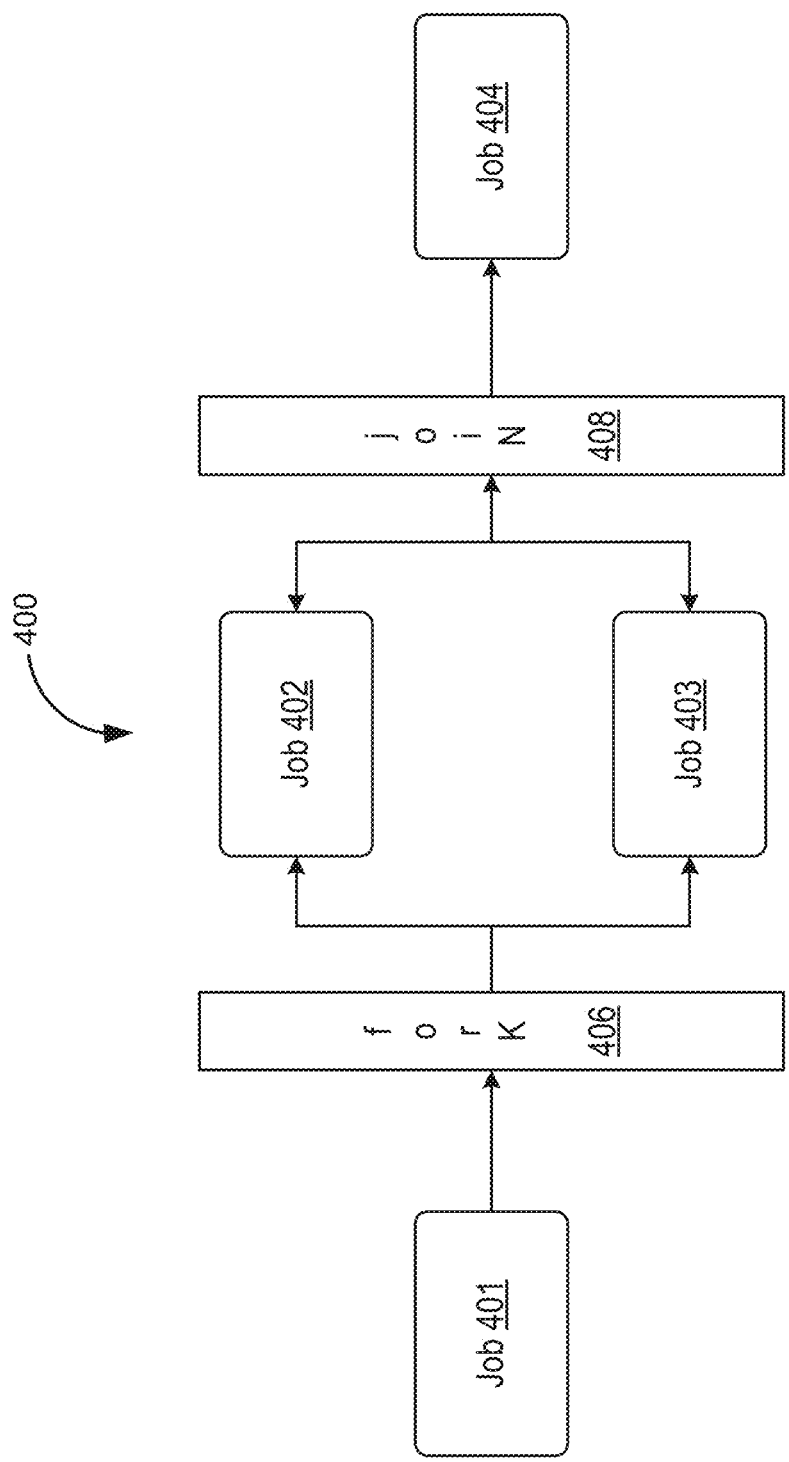
FIG. 4 provides a block diagram of a simple pipeline according to one embodiment of the present disclosure.

FIG. 4 provides a block diagram of simple pipeline 400 according to one embodiment of the present disclosure. In this illustration, a basic job pipeline 400 concerns itself with simple job execution. In reality, pipelines have a much richer syntax allowing for specific trigger events, conditional branching, manual tasks and so forth. However, that complexity is not needed for the purposes of illustrating this disclosure. The simple example flow, when completed has four job steps (Job 401, Job 402, Job 403, and Job 404), two of which (Job 402 and Job 403) have the ability to run in parallel in a distributed manner. Additional features and examples of the job pipeline 400 are described below with reference to Tables 1-11 and FIG. 5.

Figure 5:
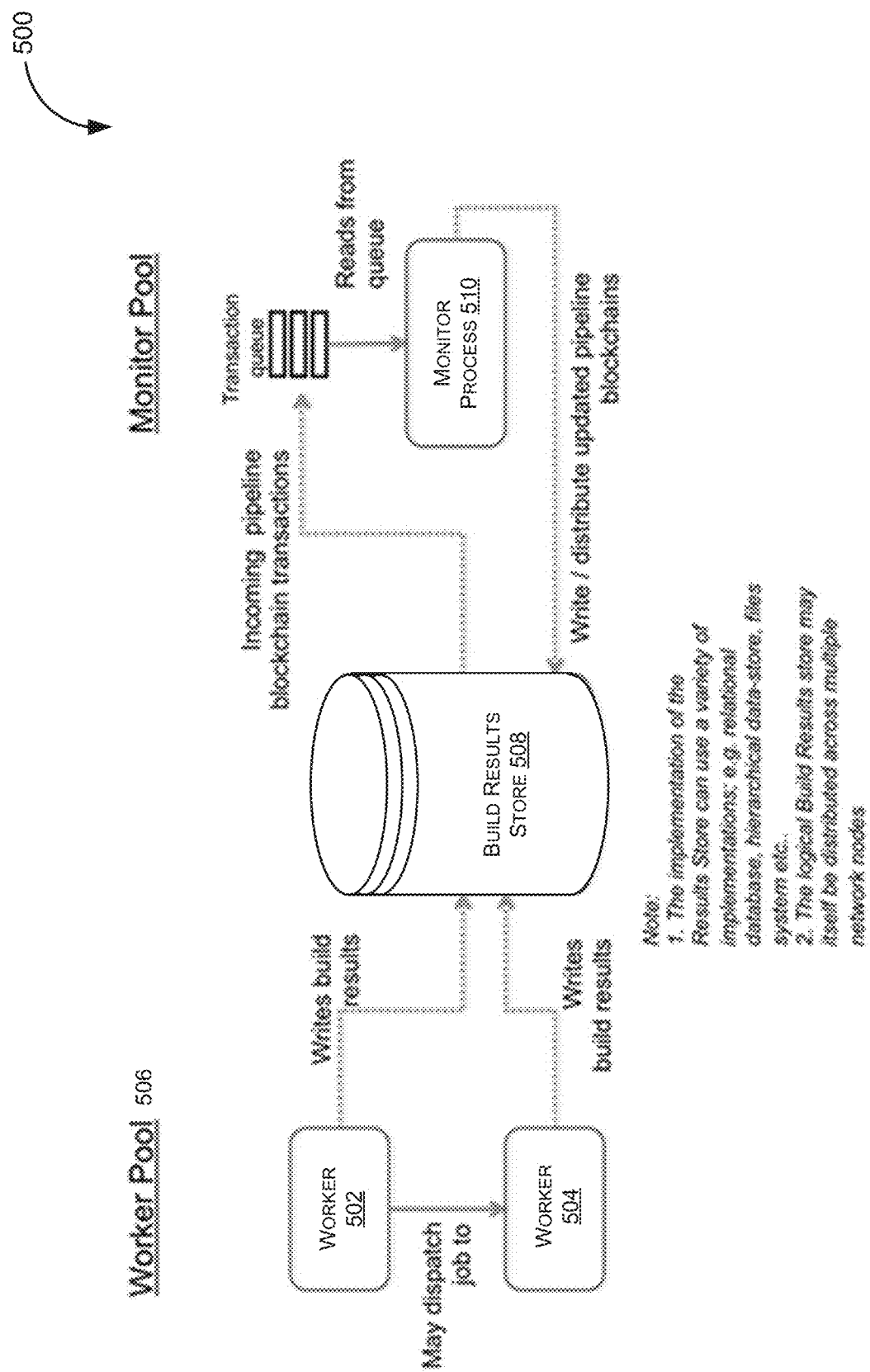
FIG. 5 illustrates processes and functions within the topology of FIG. 1 when executing the pipeline of FIG. 4 according to one embodiment of the present disclosure.

FIG. 5 illustrates processes 500 and functions within a topology (e.g., topology 100) when executing a pipeline (e.g., pipeline 400 of FIG. 4) according to one embodiment of the present disclosure. When considering this illustration, topology 100 can use two available workers, worker 502 and worker 504, in a worker pool 506, which share a common build results store 508. Furthermore, this particular implementation uses a worker pool 506 of separate asynchronous processes to manage the pipeline blockchain records, allowing each task to be offloaded from the main pipeline workers 502, 504 and maximizing their throughput. This example uses a hub-model where workers 502, 504 can act as both dispatchers and job executors, however, the principles illustrated here are just as applicable to a more conventional master-servant or hub and spoke model where dedicated processes manage the dispatch and writeback functions.

Stepping through the job execution, the progression of the blockchain metadata in the actual dispatch packets and in the build results store 508 is illustrated. For the sake of illustration, a simple, json-style, syntax is used for the pipeline blockchain. Additionally, in the interest of maintaining brevity, additional complexity of pipeline/job definition versioning or details of the job instruction payloads themselves has been added.

In a first step, the pipeline is initiated. In this step, worker 502 of FIG. 5 is handed a job execution packet describing the initial state of the pipeline and the task to be completed. Worker 502 is in control of the pipeline and processes the job information and performs any requisite tasks associated with Job 401. Table 1 illustrates the pipeline blockchain and job information in the execution packet for Job 401.

TABLE 1

| | |
|---|---|
| Pipeline Blockchain | pipeline{id="2ab",[<br>    job401,<br>    fork{[<br>        job402,<br>        job403<br>    ]},<br>    job404<br>]} |
| Job information | job401{build="1a1", ...} (further details not important) |

When Job 401 completes on worker 502, the job packet is now updated with the build results and both the results and the pipeline blockchain written to the Build Results Store 508. Table 2 illustrates the Build Results Store 508 after receiving the pipeline blockchain from Worker 1.

TABLE 2

| Build Id | Results | Pipeline Blockchain |
|---|---|---|
| 1a1 | . . . | pipeline{id="2ab",[<br>    job401{build="1a1",<br>    state="ok"},<br>    fork{[<br>    job402,<br>    job403<br>    ]},<br>    job404<br>]} |

Now that Job 401 has been processed, worker 502, which still has control of the pipeline, can look at the blockchain to understand the next step. Seeing the fork directive (e.g., fork 406 of FIG. 4), worker 502 can carry out two actions. First, worker 502 can define and queue the next job defined within the fork 406 (Job 402) for processing by itself. In parallel, worker 502 can invoke worker 504 to handle Job 403. Table 3 illustrates the pipeline blockchain and job information in the execution packet for Job 402.

TABLE 3

| Pipeline Blockchain | pipeline{id="2ab",[<br>    job401{build="1a1",<br>    state="ok"},<br>    fork{[<br>    job402{build="1a2"},<br>    job403{build="1a3"}<br>    ]},<br>    job404<br>]} |
|---|---|
| Job information | job402{build="1a2", ...} (further details not important) |

Table 4 illustrates the pipeline blockchain and job information in the execution packet for Job 403.

TABLE 4

| Pipeline Blockchain | pipeline{id="2ab",[<br>    job401{build="1a1",<br>    state="ok"},<br>    fork{[<br>    job402{build="1a2"},<br>    job403{build="1a3"}<br>    ]},<br>    job404<br>]} |
|---|---|
| Job information | job403{build="1a3", ...} (further details not important) |

Continuing the example, assume worker 502 finishes the processing of Job 402 before worker 504 finishes the process of Job 403, worker 502 can write its result record into the Build Results Store 508, including the updated pipeline blockchain. Table 5 illustrates the Build Results Store 508 after receiving the pipeline blockchain from worker 502.

TABLE 5

| Build Id | Results | Pipeline Blockchain |
|---|---|---|
| 1a1 | . . . | pipeline{id="2ab",[<br>    job401{build="1a1",<br>    state="ok"},<br>    fork{[<br>    job402,<br>    job403<br>    ]},<br>    job404<br>]} |

TABLE 5-continued

| Build Id | Results | Pipeline Blockchain |
|---|---|---|
| 1a2 | . . . | pipeline{id="2ab",[<br>    job401{build="1a1",<br>    state="ok"},<br>    fork{[<br>    job402{build="1a2",<br>    state="ok"},<br>    job403{build="1a3"}<br>    ]},<br>    job404<br>]} |

As part of the process of writing the results record, worker 502 can review the latest version of the pipeline blockchain from the record store and as part of that will see that Job 403 is still pending. As the next step in the pipeline is the logical join 408 between Job 402 and Job 403, worker 502 will realize that there is nothing further it can do and return itself to the pool 506 for other work.

In some embodiments, writing a new record to the Build Results Store 508 can trigger the record to be queued for review by the monitor process 510. The monitor process 510 can review the other records in the store 508 that relate to the same pipeline instance ("2ab") and update the pipeline blockchain for those. Table 6 illustrates the Build Results Store 508 after reviewing other records in the store 508 that relate to the same pipeline instance.

TABLE 6

| Build Id | Results | Pipeline Blockchain |
|---|---|---|
| 1a1 | . . . | pipeline{id="2ab",[<br>    job401{build="1a1",<br>    state="ok"},<br>    fork{[<br>    job402{build="1a2",<br>    state="ok},<br>    job403{build="1a3"}<br>    ]},<br>    job404<br>]} |
| 1a2 | . . . | pipeline{id="2ab",[<br>    job401{build="1a1",<br>    state="ok"},<br>    fork{[<br>    job402{build="1a2",<br>    state="ok"},<br>    job403{build="1a3"}<br>    ]},<br>    job404<br>]} |

Worker 504, now having completed, can write its result record into the Build Results Store 508, including the updated pipeline blockchain and receiving back the latest version of the blockchain in the process. Table 7 illustrates the Build Results Store 508 after receiving the pipeline blockchain from worker 504.

TABLE 7

| Build Id | Results | Pipeline Blockchain |
|---|---|---|
| 1a1 | ... | pipeline{id="2ab",[<br>  job401{build="1a1",<br>  state="ok"},<br>  fork{[<br>    job402{build="1a2",<br>    state="ok"},<br>    job403{build="1a3"}<br>  ]},<br>  job404<br>]} |
| 1a2 | ... | pipeline{id="2ab",[<br>  job401{build="1a1",<br>  state="ok"},<br>  fork{[<br>    job402{build="1a2",<br>    state="ok"},<br>    job403{build="1a3"}<br>  ]},<br>  job404<br>]} |
| 1a3 | ... | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404<br>]} |

Note at this point it does not matter if the blockchain monitor has not had an opportunity to update the transaction record in 1a1. However, as the build result is written, the blockchain for pipeline instance 2ab will be queued for reconciling. Table 8 illustrates the Build Results Store 508 after reconciliation for jobs that relate to the same pipeline instance.

TABLE 8

| Build Id | Results | Pipeline Blockchain |
|---|---|---|
| 1a1 | ... | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404<br>]} |
| 1a2 | ... | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404<br>]} |
| 1a3 | ... | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404<br>]} |

Worker 504, on receiving the latest version of the pipeline blockchain, can understand that all parallel branches within the fork 406 are now completed and, as such, can formulate the next job dispatch packet for the continuing pipeline, which it can either handle itself or pass onto another suitable worker. Table 9 illustrates the pipeline blockchain and job information in the execution packet for Job 404.

TABLE 9

| | |
|---|---|
| Pipeline Blockchain | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404{build="1a4"}<br>]} |
| Job information | job404{build="1a4", ...} (further details not important) |

Once worker 504 has completed Job 404, the pipeline is over and the pipeline blockchain can indicate that fact. Worker 504 can return itself to the pool 506 having written the final build results. Table 10 illustrates the Build Results Store 508 after receiving the final pipeline blockchain from worker 504.

TABLE 10

| Build Id | Results | Pipeline Blockchain |
|---|---|---|
| 1a1 | ... | pipeline{id="2ab",[<br>  job401{build="1a1",<br>  state="ok"},<br>  fork{[<br>    job402{build="1a2",<br>    state="ok"},<br>    job403{build="1a3",<br>    status="ok"}<br>  ]},<br>  job404<br>]} |
| 1a2 | ... | pipeline{id="2ab",[<br>  job401{build="1a1",<br>  state="ok"},<br>  fork{[<br>    job402{build="1a2",<br>    state="ok"},<br>    job403<br>  ]},<br>  job404<br>]} |
| 1a3 | ... | pipeline{id="2ab",[<br>  job401{build="1a1",<br>  state="ok"},<br>  fork{[<br>    job402{build="1a2",<br>    state="ok"},<br>    job403{build="1a3",<br>    state="ok"}<br>  ]},<br>  job404<br>]} |

TABLE 10-continued

| Build Id | Results | Pipeline Blockchain |
|---|---|---|
| 1a4 | . . . | pipeline{id="2ab",[<br>    job401{build="1a1",<br>    state="ok"},<br>    fork{[<br>        job402{build="1a2",<br>        state="ok"},<br>        job403{build="1a3",<br>        state="ok"}<br>    ]},<br>    job404{build="1a4",<br>    status="ok"}<br>]} |

In some embodiments, reconciliation is performed. For example, some blockchain fixup may be required to finally reconcile the latest transactions within the pipeline. Table 11 illustrates the Build Results Store 508 after reconciliation for jobs that relate to the same pipeline instance.

TABLE 11

| Build Id | Results | Pipeline Blockchain |
|---|---|---|
| 1a1 | . . . | pipeline{id="2ab",[<br>    job401{build="1a1",<br>    state="ok"},<br>    fork{[<br>        job402{build="1a2",<br>        state="ok"},<br>        job403<br>    ]},<br>    job404{build="1a4",<br>    status="ok"}<br>]} |
| 1a2 | . . . | pipeline{id="2ab",[<br>    job401{build="1a1",<br>    state="ok"},<br>    fork{[<br>        job402{build="1a2",<br>        state="ok"},<br>        job403<br>    ]},<br>    job404{build="1a4",<br>    status="ok"}<br>]} |
| 1a3 | . . . | pipeline{id="2ab",[<br>    job401{build="1a1",<br>    state="ok"},<br>    fork{[<br>        job402{build="1a2",<br>        state="ok"},<br>        job403{build="1a3",<br>        state="ok"}<br>    ]},<br>    job404{build="1a4",<br>    status="ok"}<br>]} |
| 1a4 | . . . | pipeline{id="2ab",[<br>    job401{build="1a1",<br>    state="ok"},<br>    fork{[<br>        job402{build="1a2",<br>        state="ok"},<br>        job403{build="1a3",<br>        state="ok"}<br>    ]},<br>    job404{build="1a4",<br>    status="ok"}<br>]} |

From this illustration, it can be observed that the presence of the transactional pipeline blockchain allows a worker to evaluate what action to take next, without having to return control to a central dispatcher. This is particularly important where the worker is not in a position to check back with a central dispatcher because of security constraints. The blockchain monitor process may need to handle transaction reconciliation across multiple distributed result stores, not just the simple single database that is illustrated here. Upon retrieval of any particular build result from the result store, the observer has the opportunity to get an effective view of the whole pipeline as it stands. This allows for efficient visualization and reporting of these flows without having to perform multiple federated searches across complex topologies.

By its nature, the pipeline blockchain approach provides a self-correcting mechanism for recording and reconciling the state of a pipeline after a system failure. For example, if the record store 508 becomes unavailable, pipelines can continue to process in a fail-safe mode using peer to peer reconciliation of the pipeline blockchain, thus maintaining the state of the transactions for the duration of the outage. If the Results Store 508 is a relational database, the job of the blockchain monitor is vastly reduced as the database can share a single common blockchain record against all the build records relating to a particular pipeline instance. However, there is still a part to play on the part of the monitor for reconciling pipeline blockchains in the case of multiple distributed Results Stores.

In further embodiments, the use of a transaction blockchain to manage pipeline execution within the context of a Continuous Delivery or Continuous Integration Server can be applicable to other pipeline or workflow processes, such as those that might, today, be managed using centralized BPEL (Business Process Execution Language) servers. The actual format of the pipeline blockchain is not dependent on any particular language or convention. A JSON format could be used as illustrated here, a more compact binary format, or even XML. As alluded to above, it is possible for the pipeline blockchain to be coordinated in a peer-to-peer fashion rather than it having to be written along with the build results to one or more results stores.

In the following description, for the purposes of explanation, specific details are set forth in order to provide a thorough understanding of embodiments of the disclosure. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Figure 6:
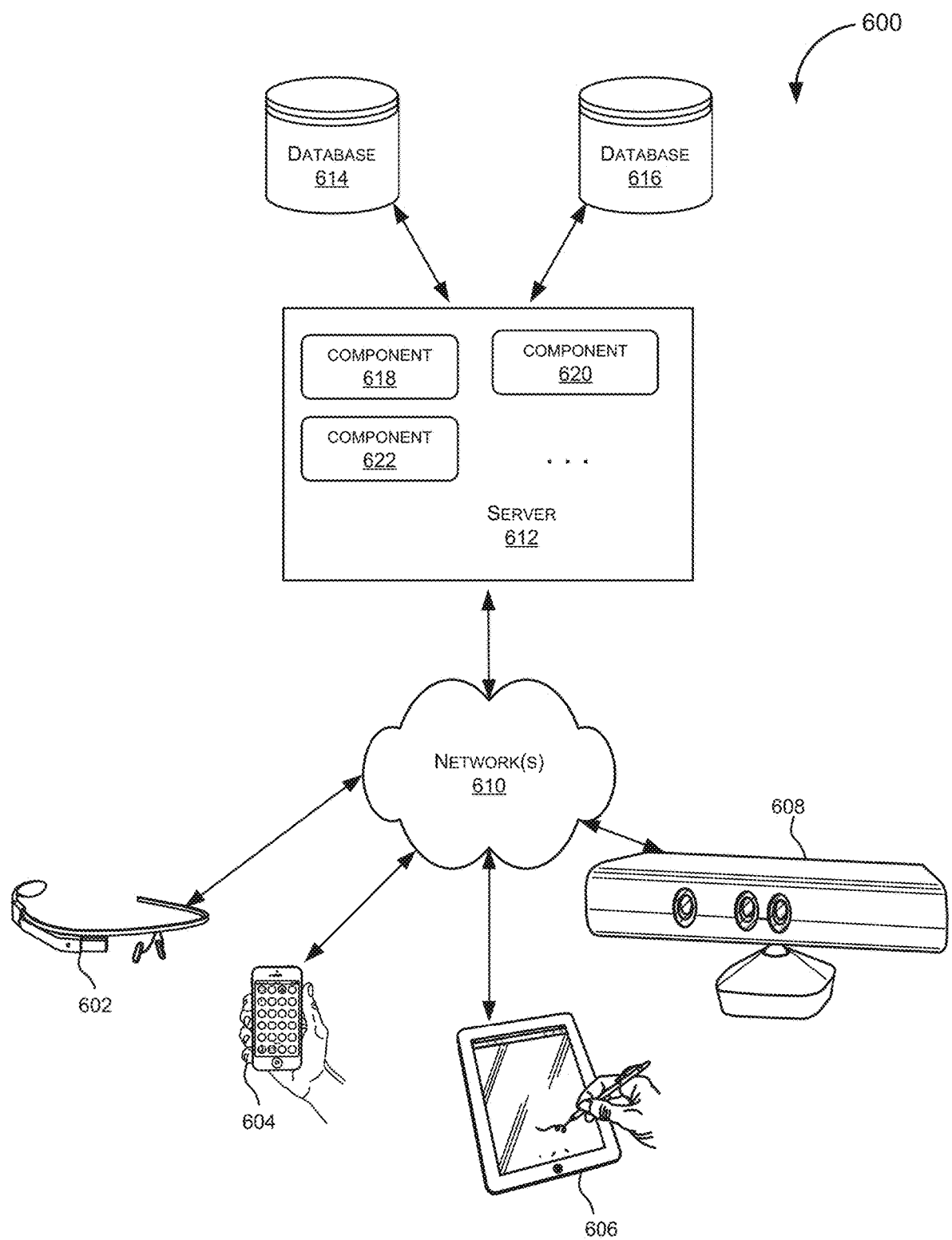
FIG. 6 depicts a simplified diagram of a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client-computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
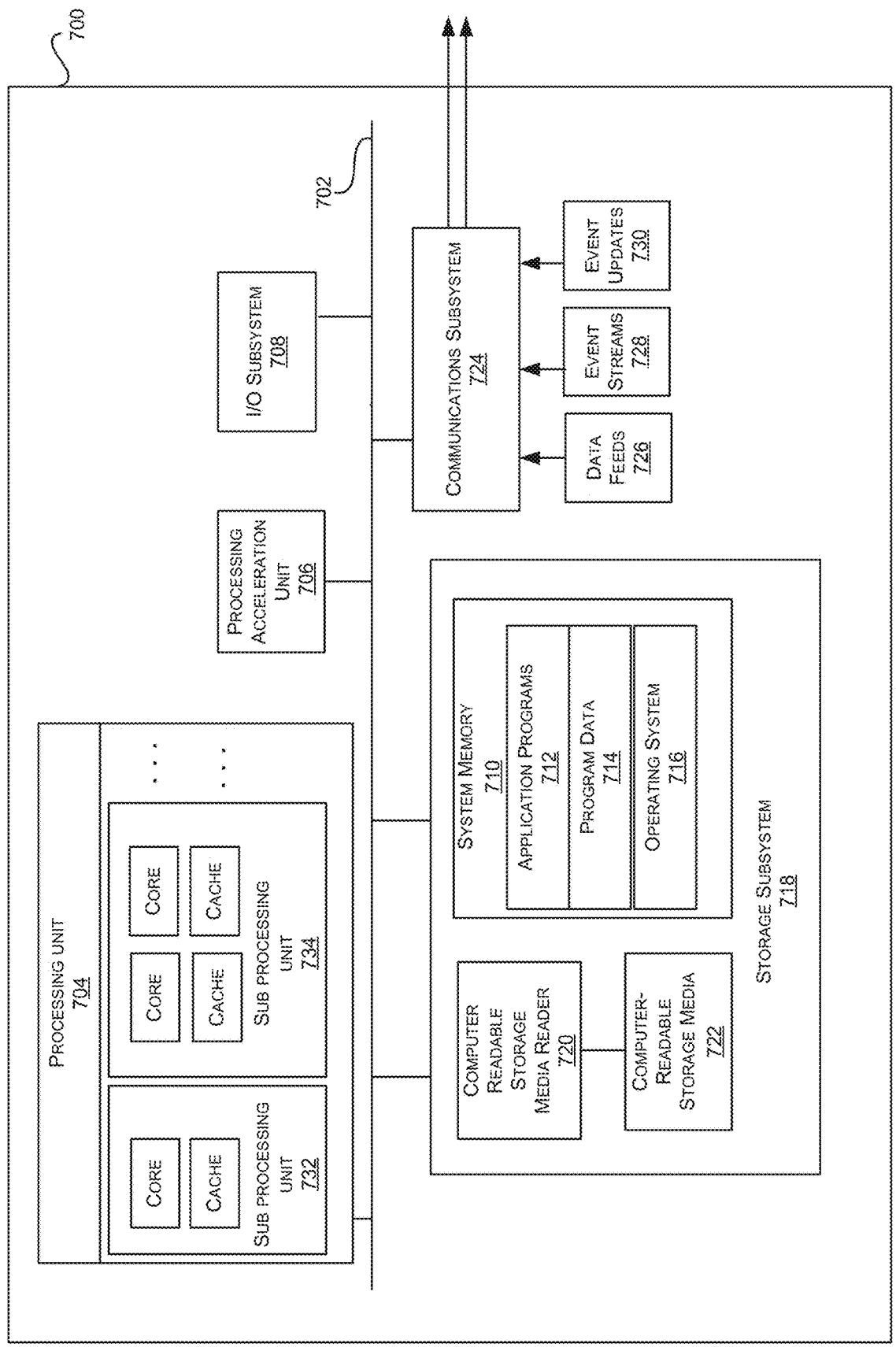
FIG. 7 illustrates an exemplary computer system, in which various embodiments of the present disclosure may be implemented.

FIG. 7 illustrates an exemplary computer system 700, in which various embodiments of the present disclosure may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718, and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present disclosure.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 8:
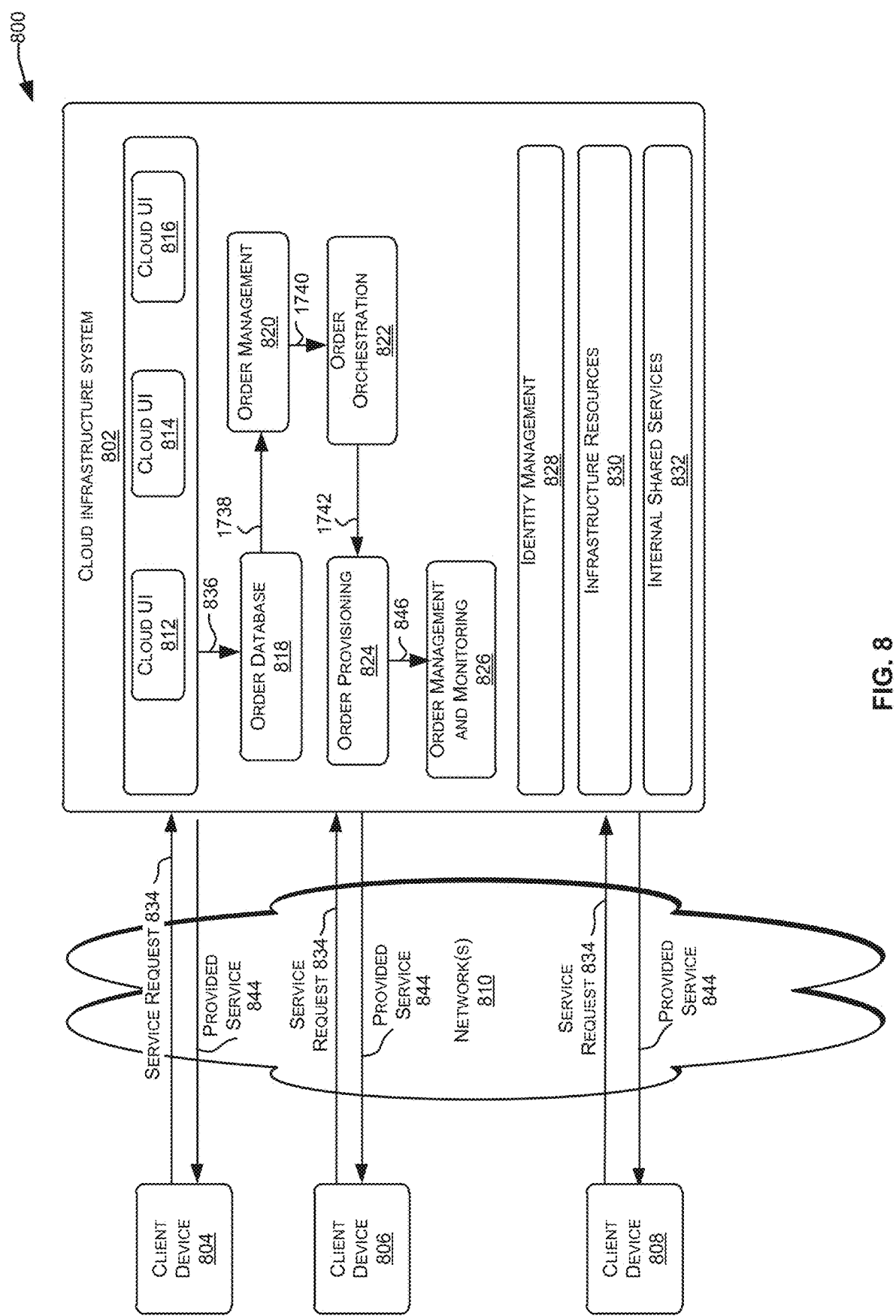
FIG. 8 is a block diagram of a system for developing applications that use mobile cloud services, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 602, 604, 606, and 608.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 1610.

Cloud infrastructure system 802 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   sending, by a computing system operating in a first network, a job package to a first build worker that is being operated in a second network behind a firewall from the first network, the job package being sent in response to launching a build pipeline, the job package comprising a plan for the build pipeline, job information, and a pipeline blockchain that comprises pipeline configuration information and transaction state;
   receiving, by the computing system, first results of a first job in the build pipeline performed by the first build worker, the first build worker holding a first transactional record associated with the first results;
   receiving, by the computing system, second results of a second job in the build pipeline performed by a second build worker that is being operated in the second network behind the firewall from the first network, the second build worker holding a second transactional record associated with the second results, and both the first job and the second job being performed according to the configuration information and the transaction state;
   updating, by the computing system, the pipeline blockchain with the second results of the second job performed by the second build worker; and
   updating, by the computing system, the first transactional record held by the first build worker based at least in part on the updated pipeline blockchain.

2. The method of claim 1, further comprising:
   storing, by the computing system, the second results of the second job in a central transaction record; and
   determining, by the computing system, whether to reconcile the second results of the second job with the first transactional record held by the first build worker.

3. The method of claim 1, wherein updating the first transactional record held by the first build worker with the updated pipeline blockchain comprises updating a build state associated with a portion of the plan for the build pipeline held at the first build worker.

4. The method of claim 1, further comprising receiving, by the computing system, a change to the build pipeline.

5. The method of claim 4, wherein the change comprises a single job of the build pipeline being divided into a plurality of sub-tasks.

6. The method of claim 4, wherein the change comprises a serial execution of one or more jobs of the build pipeline being optimized into a parallel execution of the one or more jobs.

7. The method of claim 6, wherein the change is based at least in part on loading conditions and/or an execution plan being used for the build pipeline.

8. The method of claim 7, further comprising conducting an audit of the execution plan based at least in part on the pipeline blockchain included in the job package.

9. The method of claim 4, further comprising propagating, by the computing system, the change to the first build worker and the second build worker.

10. A non-transitory computer-readable medium storing computer-executable code that, when executed by a processor of a computing system operating in a first network, cause the processor to perform operations comprising:
    sending a job package to a first build worker that is being operated in a second network behind a firewall from the first network, the job package being sent in response to launching a build pipeline, the job package comprising a plan for the build pipeline, job information, and a pipeline blockchain that comprises pipeline configuration information and transaction state;
    receiving first results of a first job in the build pipeline performed by the first build worker, the first build worker holding a first transactional record associated with the first results;
    receiving second results of a second job in the build pipeline performed by a second build worker that is being operated in the second network behind the firewall from the first network, the second build worker holding a second transactional record associated with the second results, and both the first job and the second job being performed according to the configuration information and the transaction state;
    updating the pipeline blockchain with the second results of the second job performed by the second build worker; and
    updating the first transactional record held by the first build worker based at least in part on the updated pipeline blockchain.

11. The non-transitory computer-readable medium of claim 10, wherein the operations further comprise receiving a change to the build pipeline.

12. The non-transitory computer-readable medium of claim 11, wherein the change comprises a single job of the build pipeline being divided into a plurality of sub-tasks.

13. The non-transitory computer-readable medium of claim 11, wherein the change comprises a serial execution of one or more jobs of the build pipeline being optimized into a parallel execution of the one or more jobs, and wherein the change is based at least in part on loading conditions and/or an execution plan being used for the build pipeline.

14. The non-transitory computer-readable medium of claim 13, wherein the operations further comprise conducting an audit of the execution plan based at least in part on a blockchain included in the job package.

15. A computing system operating in a first network, comprising:
    a processor; and
    a memory storing instructions that, when executed by the processor, cause the processor to:
    send a job package to a first build worker that is being operated in a second network behind a firewall from the first network, the job package being sent in response to launching a build pipeline, the job package comprising a plan for the build pipeline, job information, and a pipeline blockchain that comprises pipeline configuration information and transaction state;

receive first results of a first job in the build pipeline performed by the first build worker, the first build worker holding a first transactional record associated with the first results;

receive second results of a second job in the build pipeline performed by a second build worker that is being operated in the second network behind the firewall from the first network, the second build worker holding a second transactional record associated with the second results,. and both the first job and the second job being performed according to the configuration information and the transaction state;

update the pipeline blockchain with the second results of the second job performed by the second build worker; and update the first transactional record held by the first build worker based at least in part on the updated pipeline blockchain.

16. The computing system of claim 15, wherein the instructions further cause the processor to receive a change to the build pipeline and propagate the change to the first build worker and the second build worker.

17. The computing system of claim 16, wherein the change comprises a single job of the build pipeline being divided into a plurality of sub-tasks or a serial execution of one or more jobs of the build pipeline being optimized into a parallel execution of the one or more jobs.

* * * * *

UNITED STATES PATENT AND TRADEMARK OFFICE
CERTIFICATE OF CORRECTION

PATENT NO. : 10,853,059 B2
APPLICATION NO. : 16/552777
DATED : December 1, 2020
INVENTOR(S) : Mills Page 1 of 1

It is certified that error appears in the above-identified patent and that said Letters Patent is hereby corrected as shown below:

In the Claims

In Column 27, Line 14, in Claim 15, delete "results,." and insert -- results, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*